Dec. 13, 1960
W. L. FAWCETT
2,964,514
OLEFIN POLYMERIZATION PROCESS
Filed Sept. 10, 1956
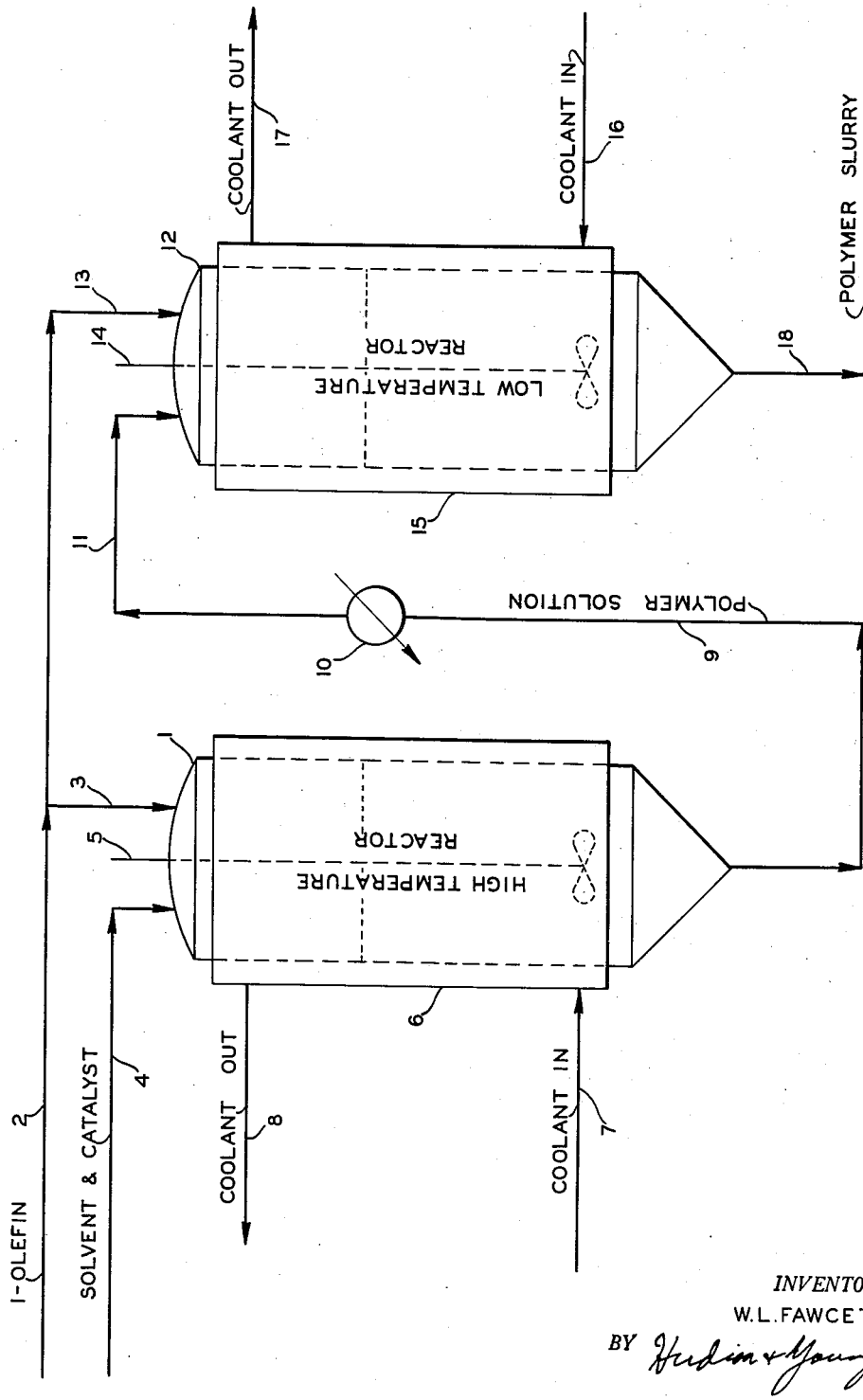
INVENTOR.
W.L.FAWCETT
BY *Hudson & Young*
ATTORNEY'S 2,964,514

OLEFIN POLYMERIZATION PROCESS

William L. Fawcett, Bartlesville, Okla., assignor to Phillips Petroleum Company, a corporation of Delaware Filed Sept. 10, 1956, Ser. No. 609,009

10 Claims. (Cl. 260—94.9)

This invention relates to an improvement in a process for the polymerization of olefins and mixtures of olefins in the presence of a chromium oxide-containing catalyst. In one aspect of the invention, it relates to an improved process for producing high molecular weight ethylene polymers in high yields.

It has been recently discovered that 1-olefins having a maximum of 8 carbon atoms per molecule and no branching nearer the double bond than the 4-position can be polymerized to solid and semi-solid polymers at low temperatures and pressures as compared with conventional processes for polymerizing these olefins. Such polymerization is generally carried out by first admixing and at least partially dissolving the olefins in a non-polymerizable solvent and carrying out the polymerization in the presence of a catalyst.

In the copending application of Hogan et al., filed December 20, 1954, and having Serial No. 476,306, now abandoned, a process is disclosed for producing novel polymers of 1-olefins by carrying out the polymerization at a temperature in the range of 100 to 500° F. in the presence of 0.1 to 10 or more weight percent of chromium as chromium oxide, including a substantial proportion of hexavalent chromium associated with at least one porous oxide selected from the group consisting of silica, alumina, zirconia and thoria. A preferred catalyst is one comprising 0.1 to 10 weight percent chromium as the oxide on a silica-alumina support such as 90 percent silica–10 percent alumina. This catalyst is ordinarily a highly oxidized catalyst which has been activated by high-temperature treatment under non-reducing conditions and preferably in an atmosphere of an oxidizing gas. Olefins, other than 1-olefins as described are polymerized by the action of this catalyst but many of the resulting polymers are preponderantly normally liquid at least when polymerized under the described conditions. The polymerization is suitably carried out in the liquid phase such as in solution in a hydrocarbon solvent, especially a paraffin or cycloparaffin which is a liquid under the polymerization conditions; however, vapor phase operation or mixed phase operation can be effected. Also, diolefins can be polymerized by the chromium oxide catalyst to produce solid polymers. The instant invention is directed to an improvement in the process disclosed in the Hogan et al. application. When operating within the higher temperature range of Hogan et al., i.e., the range wherein polymer is soluble, when the polymer concentration exceeds about 12 weight percent, the solution is viscous resulting in a low heat transfer coefficient and the solution is difficult to handle by pumping, mixing, etc. Also, I have found, there is generally considerable residual catalyst activity at this concentration. On the other hand, when operating at lower temperatures, the molecular weight is exceedingly high and while the polymer is ideally suitable for some applications, it is less suitable or desirable for other uses. I have found that the effluent from the high temperature polymerization at maximum usable viscosity still contains active catalyst which can be further utilized without separation from the reaction mixture for further polymerization of olefin. By operating according to this invention, I am able to fully utilize the catalyst activity and at the same time able to obtain a polymer of the desired average molecular weight.

It is an object of this invention to provide an improved process for the polymerization of olefins to solid polymers in the presence of a chromium oxide-containing catalyst.

Another object of this invention is to provide an improved process for the production of solid 1-olefin polymers of intermediate average molecular weight which is characterized by high heat transfer and low mixing power requirements.

Another object of this invention is to provide a method of obtaining maximum catalyst efficiency.

Still other objects, advantages and features of this invention will be apparent to those skilled in the art having been given this disclosure.

According to this invention, an olefin is polymerized in a hydrocarbon solvent in the presence of a chromium oxide catalyst at a temperature wherein the resulting polymer is soluble in the said hydrocarbon solvent to a predetermined concentration polymer in solution, thereafter the solution is cooled to below the precipitation temperature of the polymer and additional monomer is added and polymerized using the residual activity of the catalyst. In the preferred method of operation, the initial polymerization is carried out at a temperature whereat the polymer formed has a lower molecular weight than is desired in the final product and the second polymerization is carried out at a temperature adjusted to produce a polymer of a molecular weight that is greater than that desired in the final product so that the final average molecular weight is that desired.

The advantages of operating according to this invention are several. One advantage is the better utilization of catalyst. That is a higher ratio of monomers converted per pound of catalyst. For example, when operating at higher temperatures a prescribed weight percent catalyst in the solvent is required to produce satisfactory rates of production of polymer; however, when the polymer concentration reaches about 12 percent, the heat transfer coefficient becomes extremely low and the viscosity is very high requiring extra power to maintain agitation and efficient cooling cannot be maintained. Therefore, the reaction is usually stopped. However, I have found that the catalyst is still active. A second advantage is that the average molecular weight can be varied over a wide range by controlling the amount of polymerization carried out under each reaction condition, and the product will have a broad molecular weight distribution. A third advantage is that sufficient monomer is polymerized in the presence of the catalyst that the amount of catalyst associated with polymer is insignificant and will not have to be removed. Still other advantages will be apparent to those skilled in the art.

This invention is particularly applicable to the polymerization of ethylene or ethylene in a major proportion, say, at least 90 weight percent, copolymerized with other 1-olefins. Such polymers are solids and, therefore, the viscosity of the admixture in the second polymerization step is essentially that of the solution of monomer. Examples of 1-olefins, copolymerizable with ethylene include propylene, 1-butene, 1-pentene, 1-hexene, 1-octene, 4-methyl-1-pentene, 4-methyl-1-hexene, 5-ethyl-1-hexene, 6-methyl-1-heptene, 4-ethyl-1-hexene and the like, as well as those 1-olefins having additional unsaturation such as butadiene. However, to obtain solid polymers in the second reaction, the amount of copolymerizable 1-olefin decreases with increasing molecular weight, it being within the skill of the art to determine the maximum amount of such copolymerizable monomer allowable.

The solvents especially useful in polymerization of 1-olefins are hydrocarbons and preferably paraffins and cycloparaffins. These diluents include paraffins and cycloparaffins having 3 to 12 carbon atoms per molecule. Any of the paraffins or cycloparaffins which are a solvent for the polymer at the high temperature polymerization range are suitable. Any hydrocarbon which is relatively inert, non-deleterious, and liquid under the operating conditions of the process can be utilized. Diluents that have been used successfully in the polymerization reaction and are operable in this invention include propane, isobutane, normal pentane, isopentane, isooctane (2,2,4-trimethylpentane), cyclohexane and methylcyclohexane. Unsaturated aliphatic and cyclic hydrocarbons are, in general, not used in the polymerization reaction since they are likely to enter the polymerization reaction.

Polymerization of ethylene with a chromium oxide-containing catalyst in a system in which the catalyst is in suspension in a liquid hydrocarbon can be carried out at a temperature which can be divided into three separate temperature ranges. For convenience of discussion, these temperature ranges can be designated as the low range wherein the polymer as formed is solid, the high range wherein the polymer is formed in solution, and an intermediate range wherein the polymer is only partially precipitated as solid and has a tacky consistency causing the polymer to stick to the agitator, the vessel wall and to agglomerate as tacky balls. In the case of paraffinic diluents and polyethylene, the low range is from 230° F. and below, the intermediate range is from 230° F. to 250° F., and the high range is from 250° F. and above. For cycloparaffinic diluents, the low range is from 190° F. and below, the intermediate range is from 190° F. to 250° F., and the high range is from 250° F. and above. For other copolymers, these temperature ranges can be different, it being within the swill of the art to determine optimum ranges for each system having been given this disclosure or has been previously indicated. As disclosed in the aforementioned Hogan et al. application, the polymerization can be effectively carried out in all of these temperature ranges. However, by operating first in the high range and then in the low range, certain advantages as have been mentioned are obtained. In some cases, it may be desirable to carry out the solution polymerization using cycloparaffins as the solvent and then adding a normal paraffin in the low range polymerization since such operation would substantially reduce cooling requirements.

With regard to the upper temperature limits set forth hereinabove for the low range and the low limits set forth for the high range, there is a very narrow temperature range or area where the transformation, i.e., from tacky agglomerate polymers to granular polymers and from tacky to solution, take place, and this range sets these limits, it being important that the initial polymerization be carried out at a temperature wherein the polymer formed is soluble and the final polymerization be carried out at a temperature wherein the polymer formed is precipitated as solid. The upper temperature range for the high range as disclosed by Hogan et al. is 500° F. and will most generally be about 300° F. The lower temperature limit for the low range is not critical, but the reaction rate is often undesirably low below 150° F. and impractical below 100° F.

Various reaction systems can be utilized in practicing the process of the instant invention, including mechanically agitated or stirred reaction and jet agitated reactions. These types of reaction systems are described in the literature. When operating, agitated reactors in accordance with this invention in the first or high range step, the reaction mixture comprises solid catalyst suspended in a solution of monomer and polymer due to the agitation. In the low range, the reaction mixture comprises solid polymer particles containing catalyst suspended in the liquid solvent. Substantially all of the polymer produced is in solid particle form, only a small amount (usually not over 1 or 2 weight percent of the total polymer) of light polymer being dissolved in the liquid hydrocarbon. Accordingly, the continuous phase has a viscosity only slightly higher than that of the reaction medium, and the total suspension or slurry has an apparent viscosity which is substantially less than that of the higher temperature solution. The low viscosity suspenion enables the polymerization to be effected with good heat transfer and relatively low power requirements.

When operating in the high temperature range, the liquid hydrocarbon has a high solvent power for the polymer. As a result, the continuous liquid phase has a relatively high viscosity, and the polymer content of the reaction mixture seldom exceeds about 15 weight percent and preferably, for this invention, not over about 12 weight percent. This 15 percent concentration is about the practical limit, when using conventional apparatus, because of the mixing power requirements and the heat transfer characteristics of the viscous system. In the intermediate temperature range, the solubility of the polymer in the liquid hydrocarbon is between that in the high and low ranges. However, the tacky nature of the solid particles at the temperatures in the intermediate range causes agglomeration of the particles into larger clumps and accumulation of the solids on the reactor surfaces. These two factors result in a decrease in the heat transfer to the cooling jackets and also cause a substantial increase in the power required to effect dispersal of the clumps sufficiently to maintain operability.

The entire reaction can be carried out at the low temperature range. However, polymer resulting from such polymerization has exceedingly high molecular weight which may not be desired for all uses. Also, the reaction rate is lower at the lowest temperature and, therefore, it is desirable to carry out, at least, a portion of the operation at the higher temperatures.

The catalyst utilized in this invention comprises as an essential ingredient, chromium oxide, preferably including a substantial amount of hexavalent chromium. The chromium oxide is ordinarily associated with at least one other oxide, particularly at least one oxide selected from the group consisting of silica, alumina, zirconia and thoria.

The chromium oxide content of the catalyst can range from 0.1 to 10 or more weight percent, e.g., up to about 50 percent or even higher, but the preferred range is from 2 to 6 weight percent, expressed as elemental chromium. A preferred non-chromium component is a silica-alumina composite containing a major proportion of silica and a minor proportion of alumina. While the method for preparing the silica-alumina composite undoubtedly effects to some extent the catalyst activity, it appears that composites prepared by any of the prior art processes for preparing such catalytically active composites, e.g., coprecipitation or impregnation, are operative for the process of this invention. Methods for the preparation and activation of this catalyst are described in detail in the Hogan et al. application, supra. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 900 to about 1000° F., under non-reducing conditions and preferably in an oxidizing atmosphere, e.g., a stream of substantially anhydrous dew point, preferably of 0° F. or lower, oxygen containing gas, such as air. A commercial micro-spheroidal silica-alumina composite can also be advantageously used in the preparation of the catalyst.

The catalyst as employed in the instant process is in the form of a relatively fine powder so that it may be easily maintained in suspension or as a slurry in the liquid solvent or solution. The catalyst powder generally has a particle size of 30 mesh and smaller, preferably 50 mesh and smaller. While the catalyst size is not critical, it should be small enough so that it can be readily maintained as a slurry in the liquid hydrocarbon.

The concentration of the catalyst in the reaction zone can vary within wide limits, and the actual concentration will depend to a large degree upon practical consideration. For example, if the polymer product is to be utilized in the manufacture of pipe, the polymer product can tolerate a higher ash content than if the polymer is to be utilized to make other types of material, e.g., film or electrical insulators. Accordingly, higher concentrations of catalyst in the reaction zone can be utilized where the ash content of the polymer is of secondary importance. However, when operating with high catalyst concentrations, the very high yields of polymer per pound of catalyst, which are obtainable with the process of this invention, will be considerably lessened. This is caused by the fact that the upper limit of polymer concentration in the low temperature reaction zone at which it is practical to operate with most conventional reactors is generally between about 30 to about 40 percent of the total reaction mixture. When the polymer concentration is above this upper limit, it has been found that the desirable operating characteristics of easy mixing and good heat transfer are to a certain degree diminished. As a result, it sometimes becomes necessary to terminate the reaction even though there is still active catalyst present in the reaction zone. It is to be understood, however, that the addition of additional liquid hydrocarbon to the reaction zone will allow the process to continue with the aforementioned desirable operating conditions. Thus, while the concentration of catalyst in the reaction mixture is not critical and will depend upon the economics of the specific application of the instant process, it can be stated that the concentration of catalyst in the reaction zone will generally be in the range of 0.01 to 5 weight percent, preferably 0.05 to 1.0 weight percent, based upon the total amount of reaction medium, i.e., liquid hydrocarbon diluent, present in the reaction zone. It is often desirable to obtain a polymer containing less than 0.1 weight percent ash, since such a polymer is in general suitable for all uses, without treating for catalyst removal. Since yields as high as 1000 pounds of polymer per pound of catalyst and higher are readily obtainable by operating in accordance with the instant invention, it becomes economically practicable with the instant process to obtain a polymer having an extremely low catalyst content, e.g., less than 0.1 weight percent. The foregoing discussion is not, however, to be construed as limiting. It is within the scope of this invention to operate with a polymer content of 50 or more weight percent based on the weight of the reaction mixture by use of heavy-duty stirring motors, kneaders, and/or other agitators of special design.

Even as discussed with relation to catalyst concentration, there are no critical residence or contact times for practicing the process of this invention. The contact time can vary widely for any given set of operating conditions under either reaction conditions. However, the residence time should not be so long as to allow excessive concentration of polymers to build up either as solution under the high temperature conditions or as polymer solids under the low pressure conditions. It can be stated that the contact time for normal ethylene feed rates will generally be in the range of 0.1 to 12 hours, preferably from 1 to 5 hours, under each reaction condition. The pressure in the system need only be sufficient to maintain the liquid hydrocarbon substantially in the liquid phase and ordinarily ranges from about 100 to about 700 p.s.i.a.

The method of this invention is applicable to both batch and continuous operations. When operating batchwise, catalyst, solvent and the initial monomer is added to the reactor preferably under reaction conditions, however, the reactor can be brought under reaction conditions, or one or more streams can be at or above reaction conditions and other streams lower so that the resulting admixture will be at reaction conditions. The reaction will be carried out to the desired polymerization under conditions wherein the polymer is soluble. The mix can then be cooled or passed to a second batch reactor at the lower temperature and additional monomer added and the reaction continued to the desired stage and preferably to the catalyst is exhaust. However, in general, the reaction will be carried out continuously and this embodiment will be described in conjunction with the drawing.

The drawing is a schematic block flow diagram of one embodiment of a continuous polymerization system for the practice of this invention.

Referring now to the drawing, ethylene is continuously fed to reactor 1 from ethylene conduit 2 via conduit 3. At the same time, catalyst in hexane as the solvent is continuously fed to the reactor 1 via conduit 4. Stirrer 5 is rotated by power means not shown in order to provide thorough mixing and agitation. Since the polymerization reaction is exothermic, cooling jacket 6 is provided. A coolant is admitted to jacket 6 via conduit 7 and leaves via conduit 8. The pressure in reactor 1 is maintained at 450 p.s.i.g. and the temperature at 300° F. The ratio of 1-olefin to that of the solvent is 0.12 to 1 and the catalyst concentration in solvent is about 2 percent. The reactor 1 is of such size as to provide a 1 hour residence time with an ethylene feed rate which provides a 12 percent polymer solution. The effluent from reactor 1 comprising primarily polymer in solution plus catalyst at 300° F. passes via conduit 9 to cooler 10 wherein the temperature is lowered to 230° F. and the polymer precipitates. The resulting slurry then passes via conduit 11 to reactor 12 wherein additional ethylene is continuously added via conduit 13. Approximately 25 parts ethylene per hour is added for each 100 parts of polymer in solvent slurry. The contents in this reactor are agitated by means of stirrer 14. The temperature in this reactor is maintained at 220° F. and the pressure at 450 p.s.i.g. Jacket 15 is provided to remove the heat of reaction by means of a coolant entering the jacket via conduit 16 and leaving via conduit 17. The residence time in this reactor is also about 1 hour. The additional polymer formed in this reactor is formed as the solid polymer containing catalyst therein. The slurry from reactor 12 comprising about 35 percent solids then passes via conduit 18 to polymer recovery zone, not shown. In the above description, pumps, valves, etc., have not been shown, it being within the skill of the art to supply these. The temperature, pressure, water, etc., are illustrated, it being understood that those having been disclosed are operative.

To further illustrate my invention, a specific embodiment will be described wherein ethylene is polymerized in the presence of a chromium oxide catalyst on a silica-alumina base as disclosed by Hogan et al. This embodiment will be described in conjunction with the figure. 52.2 pounds per hour of ethylene is continuously fed to reactor 1 via conduit 3 and 0.685 pound of catalyst in 417 pounds per hour of isooctane is continuously fed to the reactor via conduit 4. Agitator 5 is continuously operated to maintain the contents in a state of constant agitation. The reactor 1 is maintained at 299° F. and 450 p.s.i.g. The average residence time is 1.46 hours. The reaction rate in this reactor is 52.2 pounds ethylene per pound of catalyst per hour. The reactant products, 12.5 percent polymer in solution along with catalyst is passed via conduit 9 to cooler 10 wherein the temperature is lowered to 200° F., thereby precipitating polymer already formed. The resulting mixture then is passed via conduit 11 to reactor 12 at the same time 47.8 pounds per hour of ethylene is continuously added via conduit 13. Agitator 14 keeps the contents under continuous agitation. This reactor is maintained at 200° F. and 450 p.s.i.g. The average residence time in this reactor is 1.43 hours. The reactor products, 24 percent polymer in solvent, is removed via conduit 18 and is sent to polymer recovery steps, not shown. The recovered polymer has an average molecular weight of 49,000.

I claim:
1. A polymerization process which comprises initially contacting a first portion of a polymerizable material selected from the group consisting of ethylene and mixtures of ethylene with other unsaturated hydrocarbons with a solid catalyst comprising chromium oxide in which part of the chromium is hexavalent in a liquid inert hydrocarbon diluent at a temperature in the range of about 250 to about 500° F. so that a substantial part of the polymer produced is soluble in said liquid hydrocarbon diluent and wherein the polymer concentration does not exceed about 15 weight per cent and thereafter cooling the solution to below the precipitation temperature of the formed polymer, adding a second portion of a polymerizable material of the foregoing type and polymerizing same at a temperature in the range of about 100° F. to said precipitation temperature so that substantially all of the polymer produced is insoluble in said liquid hydrocarbon diluent.

2. A polymerization process which comprises contacting a first portion of a polymerizable material selected from the group consisting of ethylene and mixtures of ethylene with other aliphatic 1-olefins with a suspension of chromium oxide-containing solid contact catalyst in which part of the chromium is hexavalent in a liquid hydrocarbon diluent selected from the group consisting of paraffinic hydrocarbons and naphthenic hydrocarbons to produce a polymer concentration of solvent of not more than about 15 weight percent at a temperature in the range of about 250 to about 500° F. wherein the resulting polymers are substantially all soluble in said hydrocarbons, cooling the resulting solution to below the precipitation temperature of the polymer, adding a second portion of a polymerizable material of the foregoing type to the resulting slurry of polymer in liquid hydrocarbon and polymerizing same at a temperature in the range of about 150° F. to said precipitation temperature so that all of the polymer produced is insoluble in said liquid hydrocarbon.

3. The process of claim 2 wherein said liquid hydrocarbon is a paraffinic hydrocarbon and the polymer solution is cooled to a temperature within the range of about 150 to about 230° F.

4. The process of claim 2 wherein said liquid hydrocarbon is a naphthenic hydrocarbon and the polymer solution is cooled to a temperature in the range of about 150 to about 190° F.

5. A process for polymerizing ethylene which comprises polymerizing a first portion of ethylene in a liquid paraffin solvent at a temperature in the range of 250 to 500° F. in the presence of a catalyst comprising chromium oxide in which part of the chromium is hexavalent and at least one oxide selected from the group consisting of silica, alumina, zirconia and thoria, said catalyst being suspended in said liquid hydrocarbon, to form a polymer solution of not more than 15 weight percent polymer in said hydrocarbon solvent, cooling the resulting solution to a temperature in the range of 150 to 230° F. thereby precipitating polymer, adding a second portion of ethylene to the resulting suspension of polymer in said liquid paraffin while maintaining the temperature within the second said range so as to polymerize the added ethylene as solid particles and recovering the polymer so produced in the form of discrete particles.

6. The process of claim 5 wherein the liquid paraffin solvent is normal butane.

7. The process of claim 5 wherein the liquid paraffin solvent is normal pentane.

8. The process of claim 5 wherein the liquid paraffin solvent is isooctane.

9. A process for polymerizing ethylene which comprises polymerizing a first portion of ethylene in a liquid naphthenic hydrocarbon solvent at a temperature in the range of 250 to 500° F. in the presence of a catalyst comprising chromium oxide in which part of the chromium is hexavalent and at least one oxide selected from the group consisting of silica, alumina, zirconia and thoria, said catalyst being suspended in said liquid naphthenic hydrocarbon, to form a polymer solution of not more than 15 weight percent polymer in said hydrocarbon solvent, cooling the solution to a temperature within the range of 150 to 190° F., adding a second portion of ethylene to the resulting suspension of polymer in liquid hydrocarbon while maintaining the temperature within the second said range so as to polymerize the added ethylene as solid particles, and recovering the polymer so produced in the form of discrete particles.

10. The process of claim 9 wherein the naphthenic hydrocarbon solvent is cyclohexane.

References Cited in the file of this patent

UNITED STATES PATENTS

| | | |
|---|---|---|
| 2,632,758 | Brothman | Mar. 24, 1953 |
| 2,731,453 | Field et al. | Jan. 17, 1956 |
| 2,825,721 | Hogan et al. | Mar. 4, 1958 |